United States Patent
Sankar et al.

(10) Patent No.: US 10,262,015 B2
(45) Date of Patent: Apr. 16, 2019

(54) STORAGE AND ACCESS TIME FOR RECORDS

(71) Applicant: Microsoft Technology Licensing, LLC, Redmond, WA (US)

(72) Inventors: Sriram Sankar, Palo Alto, CA (US); Dmytro Andriyovich Ivchenko, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 760 days.

(21) Appl. No.: 14/725,437

(22) Filed: May 29, 2015

(65) Prior Publication Data

US 2016/0350344 A1   Dec. 1, 2016

(51) Int. Cl.
G06F 17/30 (2006.01)
G06F 17/27 (2006.01)

(52) U.S. Cl.
CPC .... *G06F 17/30324* (2013.01); *G06F 17/2705* (2013.01); *G06F 17/30292* (2013.01); *G06F 17/30321* (2013.01); *G06F 17/30864* (2013.01)

(58) Field of Classification Search
CPC ........... G06F 17/2705; G06F 17/30292; G06F 17/30324; G06F 17/30864; G06F 17/30289; G06F 17/30321
USPC ................................................. 707/802, 803
See application file for complete search history.

(56) References Cited

U.S. PATENT DOCUMENTS

| | | | | |
|---|---|---|---|---|
| 2004/0103077 A1* | 5/2004 | Hollines, III | ..... | G06F 17/30312 |
| 2005/0131917 A1* | 6/2005 | Auerbach | ......... | G06F 17/30327 |
| 2007/0016716 A1 | 1/2007 | Nemoto et al. | | |
| 2007/0143664 A1 | 6/2007 | Fang et al. | | |
| 2009/0254572 A1* | 10/2009 | Redlich | ................... | G06Q 10/06 |
| 2011/0252074 A1* | 10/2011 | Fujita | ................ | G06F 17/30292 |
| | | | | 707/812 |
| 2012/0095973 A1* | 4/2012 | Kehoe | ....................... | G06F 8/70 |
| | | | | 707/694 |

(Continued)

FOREIGN PATENT DOCUMENTS

WO       2016195725       12/2016

OTHER PUBLICATIONS

"International Application Serial No. PCT/US2015/038696, International Search Report dated Feb. 9, 2016", 4 pgs.

(Continued)

*Primary Examiner* — James Trujillo
*Assistant Examiner* — Fariborz Khoshnoodi
(74) *Attorney, Agent, or Firm* — Schwegman Lundberg & Woessner, P.A.

(57) ABSTRACT

In an example embodiment, information to be stored in a record is received, the information comprising at least two pieces of data of at least two different data types, at least one of the data types being of a variable length. Then a data structure is created. The data structure comprises a first portion indicating an offset size, a second portion comprising an offset pointing to a third portion of the data structure, the third portion of the data structure containing a table of offsets, each offset in the table of offsets pointing to a different one of the at least two pieces of data, the at least two pieces of data stored in a fourth portion of the data structure. A schema is also created for the data structure, the schema storing metadata for the at least two pieces of data.

20 Claims, 9 Drawing Sheets

(56) References Cited

U.S. PATENT DOCUMENTS

| | | | | |
|---|---|---|---|---|
| 2013/0018916 A1* | 1/2013 | Busch | ............... | G06F 17/30622 707/771 |
| 2014/0214814 A1* | 7/2014 | Sankar | .............. | G06F 17/30867 707/723 |
| 2014/0280356 A1* | 9/2014 | Danilak | ................ | G06F 3/0688 707/796 |
| 2015/0074149 A1* | 3/2015 | Berns | ................ | G06F 17/30292 707/803 |
| 2016/0350344 A1* | 12/2016 | Sankar | .............. | G06F 17/30324 |
| 2018/0191807 A1* | 7/2018 | Dawes | .................... | H04L 67/10 |

OTHER PUBLICATIONS

"International Application Serial No. PCT/US2015/038696, Written Opinion dated Feb. 9, 2016", 6 pgs.
"International Application Serial No. PCT/US2015/038696, International Preliminary Report on Patentability dated Dec. 14, 2017", 8 pgs.

* cited by examiner

STORAGE AND ACCESS TIME FOR RECORDS

TECHNICAL FIELD

The present disclosure generally relates to information storage in data structures in computer systems. More specifically, the present disclosure relates to data structures that improve on storage and access time for records.

BACKGROUND

There are a variety of different data structures a programmer can utilize to store data in a computer system. In storing data used for search engines, it is common to utilize an inverted index data structure. An inverted index is an index that stores a listing of which documents/results contain particular words or terms. Part of the process of creating an inverted index is to create a forward index. A forward index is an index that stores a list of words or terms contained in each document. The forward index can then be sorted to transform it into an inverted index.

Generating and maintaining a large-scale search engine index represents a significant storage and processing challenge. It is common to utilize compression to reduce the size of the various indexes, including the search forward index. Traditionally, however, the compression used has either been optimized for speed/performance, or optimized for size. For a search forward index, however, it is desirable to have both.

DESCRIPTION OF THE DRAWINGS

Some embodiments of the technology are illustrated by way of example and not limitation in the figures of the accompanying drawings.

DETAILED DESCRIPTION

Overview

The present disclosure describes, among other things, methods, systems, and computer program products, which individually provide functionality for speeding data access. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a specialized data structure is utilized to store data in a format that optimizes for both speed of access and storage space. In one example embodiment, this specialized data structure is optimized to store search forward indices.

Generally, search forward indices may be stored using a variety of different data structures, including an combination of integers (of fixed sizes of 8, 16, 32, and/or 64 bits), strings (of variable size), arrays (of fixed sizes, such as arrays of integers, or variable sizes, such as arrays of strings or records), and records (of variable sizes). Records may keep a mapping of strings to values. Records can also contain other records.

The definition of which data structures are used and how they are used for a particular index type is called a schema. In an example embodiment, optimization can occur when there are large numbers of pieces of data all utilizing the same schema. Indeed, it becomes possible to store the schema separately from the data, essentially storing the data without accompanying metadata to save space and access time.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

Figure 1:
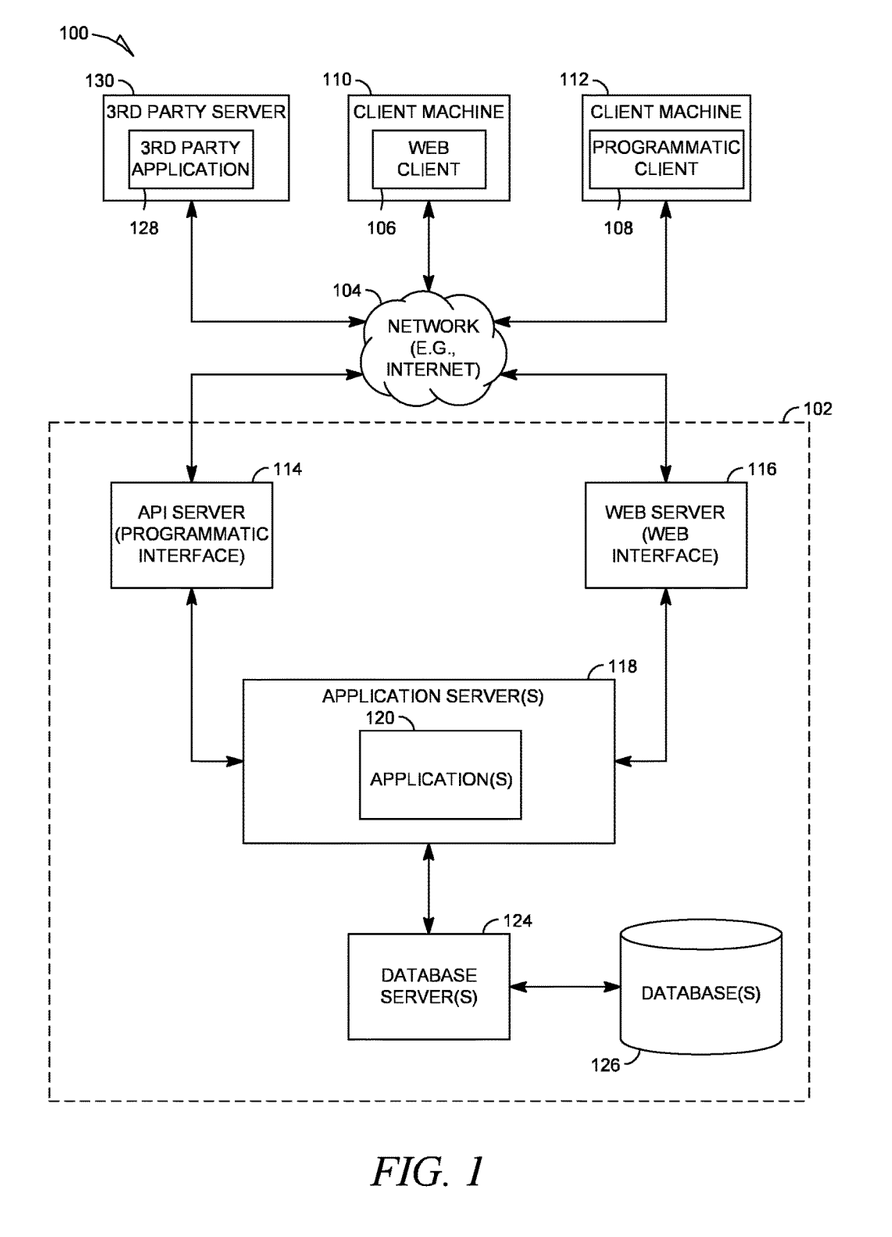
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more database 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116.

Similarly, the programmatic client 108 accesses the various services and functions provided by the application(s) 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, the any of these devices may be employed by a user to use the features of the present disclosure. In some embodiments, a user can use a mobile app on a mobile device (any of machines 110, 112 and third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
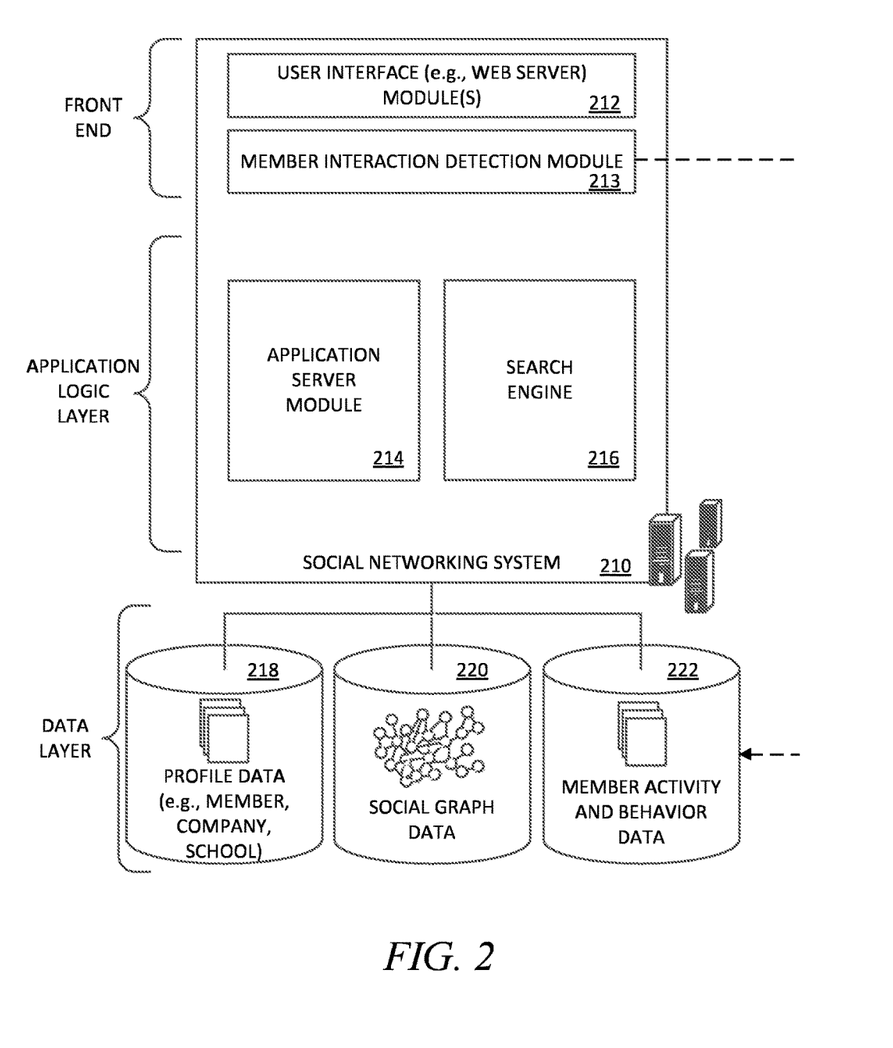
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social network service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transport Protocol (HTTP) requests, or other web-based, application programming interface (API) requests. In addition, a member interaction and detection module 213 may be provided to detect various interactions that members have with different applications, services and content presented. As shown in FIG. 2, upon detecting a particular interaction, the member interaction and detection module 213 logs the interaction, including the type of interaction and any meta-data relating to the interaction, in the member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service.

As shown in FIG. 2, a data layer may include several databases, such as a database 218 for storing profile data, including both member profile data as well as profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in the social graph database 220.

As members interact with the various applications, services and content made available via the social networking service, the members' interactions and behavior (e.g., content viewed, links or buttons selected, messages responded to, etc.) may be tracked and information concerning the member's activities and behavior may be logged or stored, for example, as indicated in FIG. 2 by the member activity and behavior database 222. This logged activity information may then be used by the search engine 216 to determine search results for a search query.

In some embodiments, databases 218, 220, and 222 may be incorporated into database(s) 126 in FIG. 1. However, other configurations are also within the scope of the present disclosure.

Although not shown, with some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when indexing member profiles, forward search indexes are created and stored. The search engine 216 facilitates the indexing and searching for content within the social network service, such as the indexing and searching for data or information contained in the data layer, such as profile data (stored, e.g., in database 218), social graph data (stored, e.g., in database 220), and member activity and behavior data (stored, e.g., in database 222). The search engine 216 may collect, parse, and/or store data in an index or other similar structure to facilitate the identification and retrieval of information in response to received queries for information. This may include, but is not limited to, forward search indexes, inverted indexes, N-gram indexes and so on.

Figure 3:
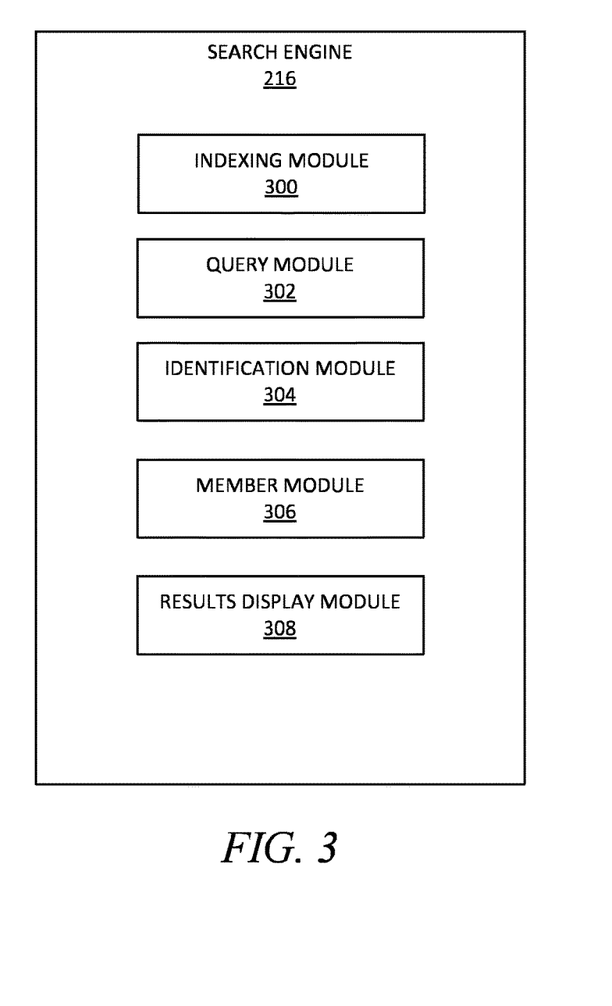
FIG. 3 is a block diagram illustrating a search engine, in accordance with an example embodiment, in more detail.

FIG. 3 is a block diagram illustrating the search engine 216, in accordance with an example embodiment, in more detail. As can be seen, the search engine 216 includes an indexing module 300. The indexing module 300 acts to index information from the social network. It should be noted that this indexing may occur either offline (e.g., performed periodically and not in response to a user query) or online (e.g., performed in real-time in response to a user query). As such, in some example embodiments the indexing module 300 may be located outside of the search engine 216, either in lieu of or in addition to inside the search engine 216.

In some examples embodiments, a query module 302 is configured and/or programmed to receive and/or access a search query, such as a search query received by the search engine 216. The query module 302 may access a full query, such as a member name or company name (e.g., "Apple"), and/or a partial query, such as a string of characters that make up a partially input query (e.g., "A-P-P"). The query module 302 may receive and/or access a variety of different query types, including natural language queries, structure queries, and so on. Also, the query module 302 may receive and/or access queries of varying scopes, such as informational queries, navigational queries, transactional queries, connectivity queries, and so on.

In some example embodiments, an identification module 304 is configured and/or programmed to identify one or more categories of data that include information satisfying the received and/or accessed search query. The identification module 304 may identify, select, and/or determine two or more categories that include and/or contain information that satisfies a received query.

For example, the identification module 304 may parse an index in order to identify categories of data that include information that satisfies a received query. The identification module 304 may determine that two or more categories of data include such information. For example, in response to a search query received by the search engine 216, the identification module 304 may identify a member database and a company database that both include information that satisfies the received query.

Example categories of information may include categories of information associated with people or members, categories of information associated with jobs, categories of information associated with companies, categories of information associated with news, categories of information associated with information posted to a social network, categories of information associated with schools and other organizations, categories of information associated with skills or attributes, and so on.

In some example embodiments, a member module 306 is configured and/or programmed to identify information associated with one or more members of a social network, such as member attribute information. For example, in response to receiving a search query from a member of the social network service, the member module 306 may identify and/or determine characteristics, attributes, activity information, social graph information, and other information associated with the member that provided the received search query.

Figure 4:
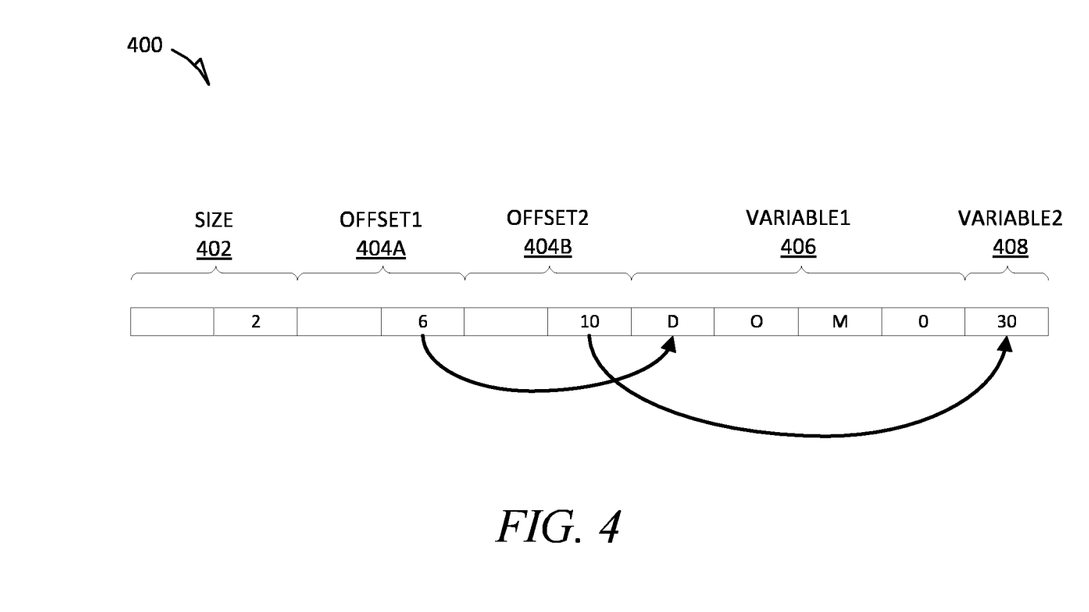
FIG. 4 is a diagram illustrating an example of the storage of data in a fixed size array in accordance with an example embodiment.

In some example embodiments, a results display module 308 is configured and/or programmed to present and/or otherwise display the results of a search query In an example embodiment, a novel data structure is utilized to store records. These records are stored with a table of offsets. FIG. 4 is a diagram illustrating an example of the storage of data in a record 400 in accordance with an example embodiment. Each offset may be set at, for example, one, two, three, or four bytes long, stored in size field 402. Here, the value of 2 is set for the size, and hence each offset is set at length of 2 bytes. Then the record 400 stores one or more offsets 404A, 404B. Each offset 404A, 404B defines the starting position for a different variable. A schema defining the fixed sizes for each variable type and various other metadata for the record 400 is stored elsewhere. In this example, the record 400 stores values for a member's first name and age. Thus, the separate schema would indicate that the record 400 stores member first name, as a 4 byte zero terminated string, followed by member age, as a 2 byte integer. Offsets 404A, 404B then only need to indicate the starting positions for the different variables in the record 400. Here, offset 404A indicates an offset of 6, which points to the sixth byte, where variable1 406 is stored, containing the 4 byte zero terminated string for the member's first name (here, "Dom"). Offset 404B indicates an offset of 10, which points to the tenth byte, where variable2

408 is stored, containing the 2 byte integer for the member's age (here, "30"). Offsets 404A and 404B represent a table of offsets.

Figure 5:
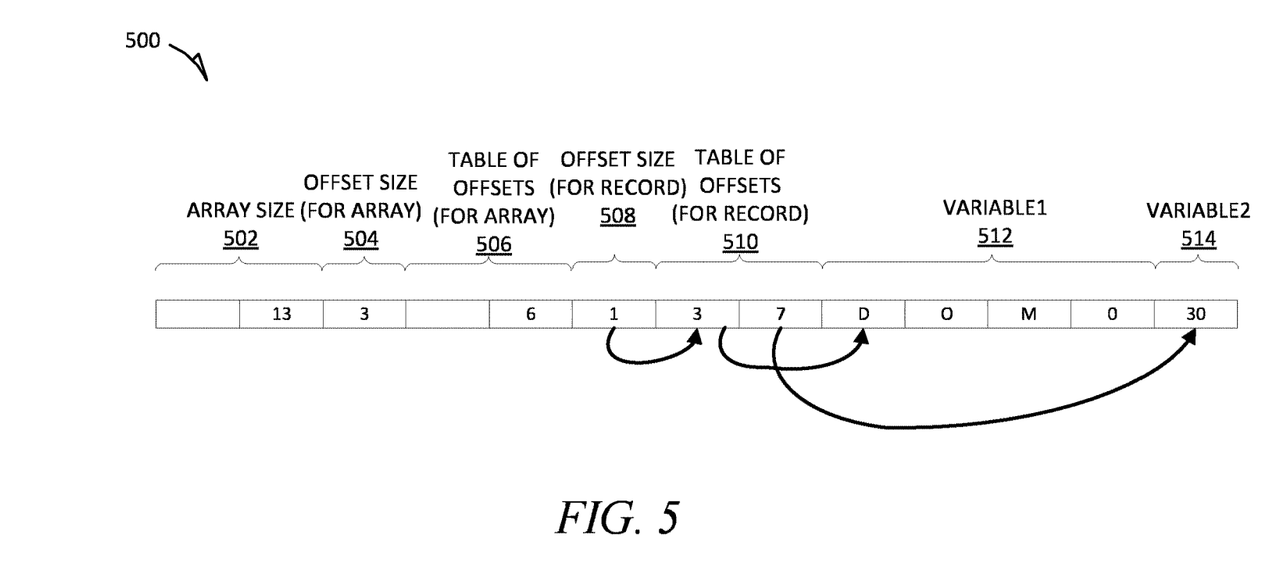
FIG. 5 is a diagram illustrating an example of the storage of data in a variable sized array in accordance with an example embodiment.

For a variable size array, a table of offsets is utilized in an example embodiment to point to individual elements, including at least one record. In some respects, in accordance with an example embodiment, a variable size array may be viewed as a combination of a fixed size array and a record. FIG. 5 is a diagram illustrating an example of the storage of data in a variable size array 500 in accordance with an example embodiment. Here, the variable size array 500 begins with a size field 502, indicating the number of elements in the array. An offset size 504 is then provided. Notably, this is the offset size for the table of offsets 506 for the array.

Here the offset size is 2, and thus each offset in the table of offsets 506 is 2 bytes. In this case, there is only one offset shown in the table of offsets 506, pointing to a record, but in other embodiments there may be multiple offsets listed in the table of offsets 506.

For the stored record, the data is stored similarly to as described above with respect to claim 4. Notably, the record begins with an offset size 508. It should be pointed out that here the offset size 508 for the record is 1 byte, while the offset size 504 for the array is 2 bytes, illustrating that these values can be different. Then the table of offsets 510 for the record is provided Here, like in FIG. 4, the two variables being stored at first name and age, but here both variables may be of variable size. Thus, a first offset in the table of offsets 510 contains the value "3", indicating that the first variable (first name) begins at an offset of "3" (relative to the beginning of the record), and thus pointing to variable1 512. The second offset in the table of offsets 510 contains the value "7", indicating that the second variable (age) begins at an offset of "7", and thus pointing to variable2 514.

By storing records and variable arrays in the above format, the system, when attempting to read a particular field in the record/array, can skip directly to that field by accessing the offset value for the field without needing to read or even visit any of the other fields. This reduces the processing power and time needed to perform a search or some other function on a field.

In an example embodiment, strings are stored in a Universal Character Set and Transformation Format-8 bit (UTF-8) terminated (aka C-string).

Figure 6:
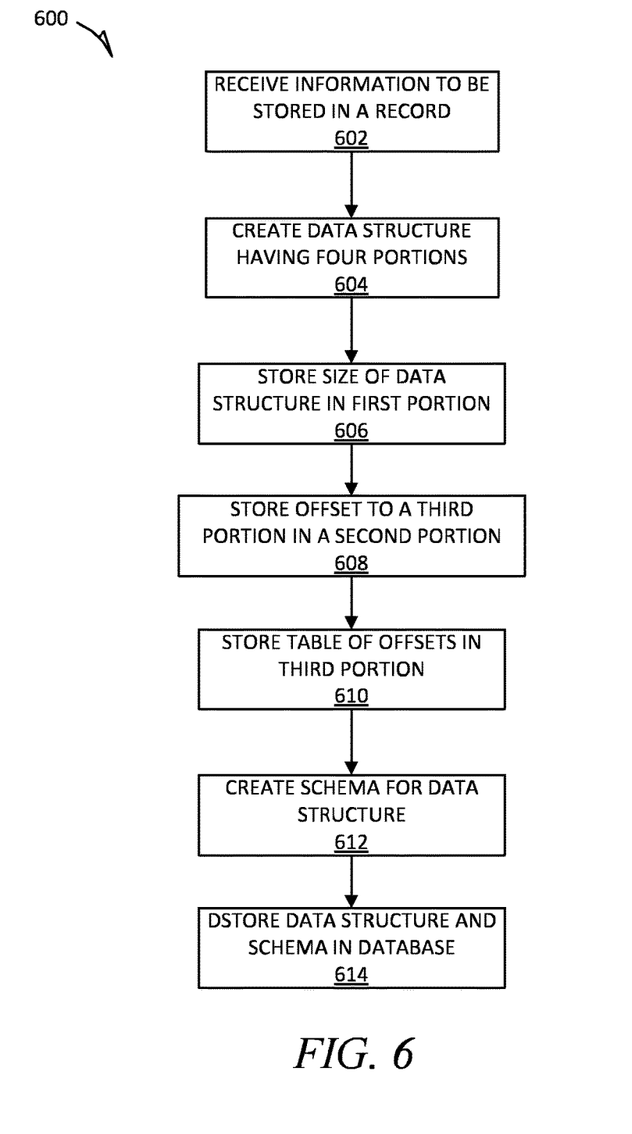
FIG. 6 is a flow diagram illustrating a method of storing a data structure in accordance with an example embodiment.

FIG. 6 is a flow diagram illustrating a method 600 of storing a data structure in accordance with an example embodiment. At operation 602, information to be stored in a record is received. This information may be, for example, information to be stored in a forward index, based on the location of words and/or terms in documents, such as member profiles in a social network. The information may comprise at least two pieces of data of at least two different data types, at least one of the data types being of a variable length. At operation 604, a data structure is created having four portions. At operation 606, a size for offsets is stored in the first portion. At operation 608, an offset pointing to a third portion of the data structure is stored in the second portion of the data structure.

At operation 610, a table of offsets is stored in the third portion of the data structure, each offset in the table of offsets pointing to a different one of the at least two pieces of data, the at least two pieces of data stored in a fourth portion of the data structure.

At operation 612, a schema is created for the data structure, the schema storing metadata for the at least two pieces of data. This metadata may include, for example, information about the ordering of how the pieces of data are stored in the fourth portion of the data structure (i.e., which piece of data is stored before which other piece of data). At operation 614, the data structure and the schema are stored in a database. The storing of the data structure may be considered to be the storing of one instance of the data structure, as the data structure and schema can be reused for different data by, for example, loading different pieces of data in the same way as described above (e.g., data from a different member profile).

Figure 7:
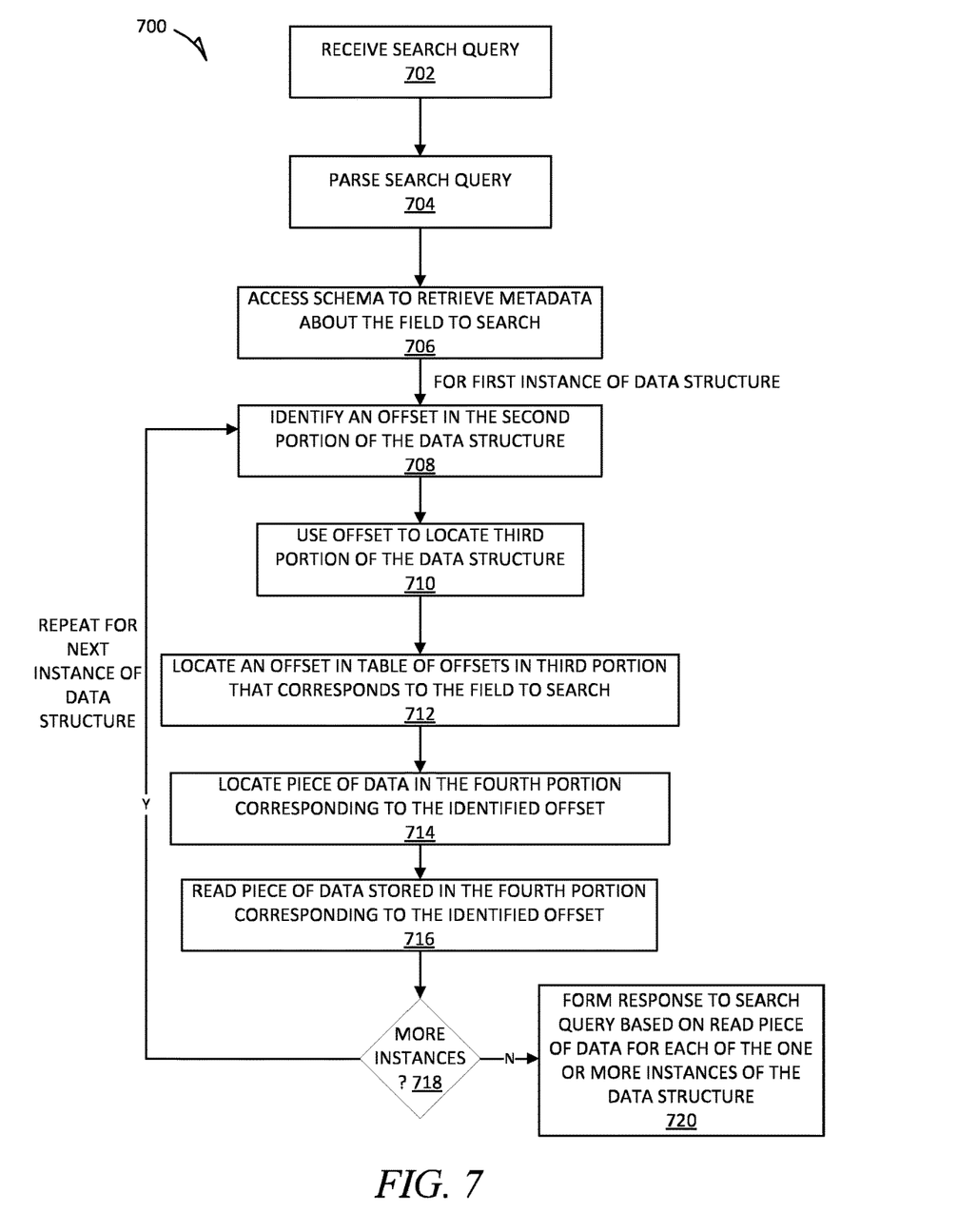
FIG. 7 is a flow diagram illustrating a method of processing a search query in an example embodiment.

FIG. 7 is a flow diagram illustrating a method 700 of processing a search query in an example embodiment. At operation 702, a search query is received. At operation 704, the search query is parsed. Through the parsing process, a field of data in a data structure may be determined to be desired in order to satisfy the query. At operation 706, the schema is accessed to retrieve metadata about the field to search. As described earlier, the metadata may include an indication of how many pieces of data precede the field to search in the data structure. At operation 708, a loop is begun where one or more instances of the data structure are traversed. For each instance, at operation 708, an offset in the second portion of the data structure is identified. Then at operation 710, the offset is used to locate the third portion of the data structure. At operation 712, an offset in the table of offsets in the third portion of the data structure is located that corresponds to the field to search based on the retrieved metadata. Then at operation 714, a piece of data stored in the fourth portion of the data structure corresponding to the identified offset in the table of offsets is located. Finally at operation 716, the piece of data stored in the fourth portion of the data structure corresponding to the identified offset is read. At operation 718, it is determined if there are any more instance of the data structure to traverse. If so, the process loops back to operation 708. If not, then at operation 720 a response to the search query is formed based on the read piece of data for each of the one or more instances of the data structure.

Example Mobile Device

Figure 8:
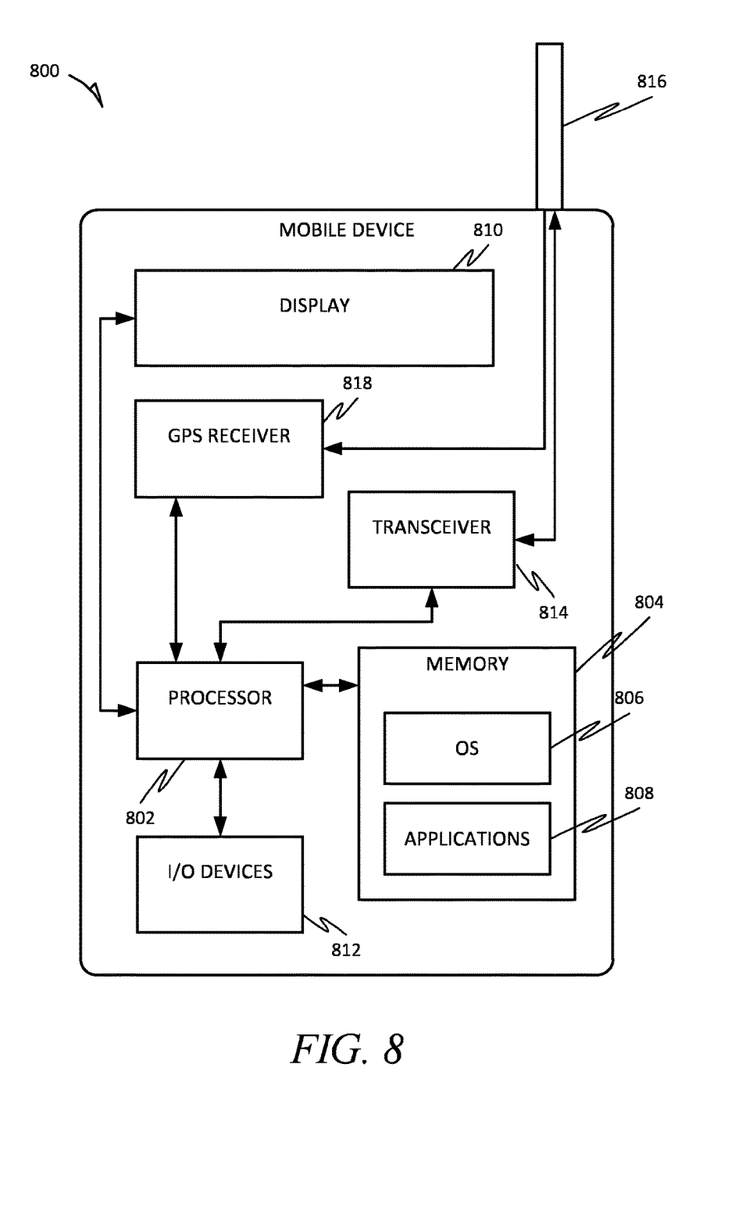
FIG. 8 is a block diagram illustrating a mobile device, according to an example embodiment.

FIG. 8 is a block diagram illustrating a mobile device 800, according to an example embodiment. The mobile device 800 can include a processor 802. The processor 802 can be any of a variety of different types of commercially available processors 802 suitable for mobile devices 800 (for example, an XScale architecture microprocessor, a microprocessor without interlocked pipeline stages (MIPS) architecture processor, or another type of processor 802). A memory 804, such as a random access memory (RAM), a flash memory, or another type of memory, is typically accessible to the processor 802. The memory 804 can be adapted to store an operating system (OS) 806, as well as application programs 808. The processor 802 can be coupled, either directly or via appropriate intermediary hardware, to a display 810 and to one or more input/output (I/O) devices 812, such as a keypad, a touch panel sensor, a microphone, and the like. Similarly, in some embodiments, the processor 802 can be coupled to a transceiver 814 that interfaces with an antenna 816. The transceiver 814 can be configured to both transmit and receive cellular network signals, wireless data signals, or other types of signals via the antenna 816, depending on the nature of the mobile device 800. Further, in some configurations, a GPS receiver 818 can also make use of the antenna 816 to receive GPS signals.

Modules, Components, and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client, or server computer system) or one or more processors 802 can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor 802 or other programmable processor 802) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 802 configured using software, the general-purpose processor 802 can be configured as different hardware-implemented modules at different times. Software can accordingly configure a processor 802, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors 802 that are temporarily configured (e.g., by software) or permanently configured to perform the relevant operations. Whether temporarily or permanently configured, such processors 802 can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors 802 or processor-implemented modules. The performance of certain of the operations can be distributed among the one or more processors 802, not only residing within a single machine, but deployed across a number of machines. In some example embodiments, the processor 802 or processors 802 can be located in a single location (e.g., within a home environment, an office environment, or a server farm), while in other embodiments, the processors 802 can be distributed across a number of locations.

The one or more processors 802 can also operate to support performance of the relevant operations in a "cloud computing" environment or as a "software as a service" (SaaS). For example, at least some of the operations can be performed by a group of computers (as examples of machines including processors 802), these operations being accessible via a network (e.g., the Internet) and via one or more appropriate interfaces (e.g., application program interfaces (APIs)).

Electronic Apparatus and System

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor 802, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors 802 executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 802), or in a combination of permanently and temporarily configured hardware can be a design choice. Below are set out hardware (e.g., machine) and software architectures that can be deployed, in various example embodiments.

Example Machine Architecture and Machine-Readable Medium

Figure 9:
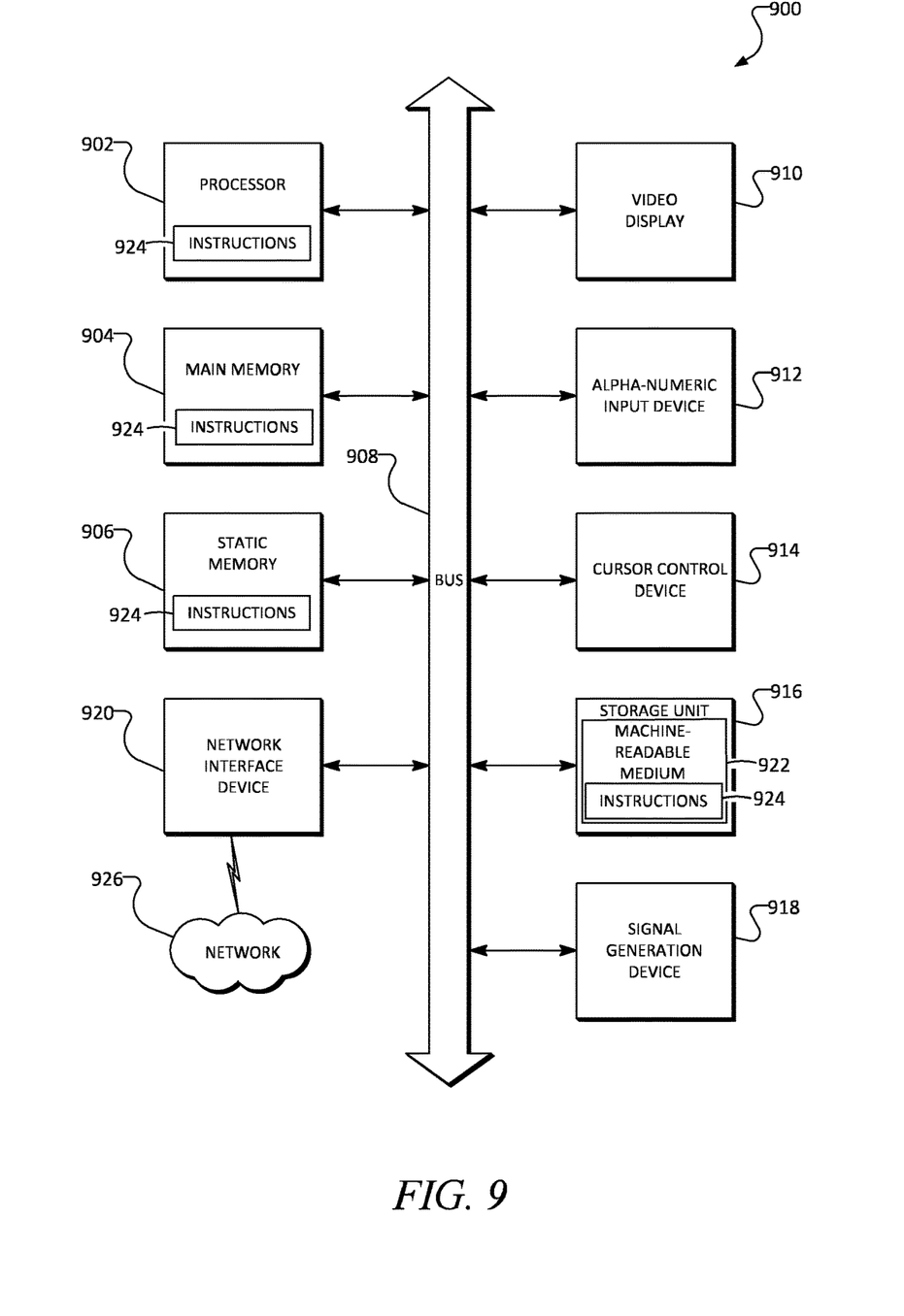
FIG. 9 is a block diagram of machine in the example form of a computer system within which instructions can be executed for causing the machine to perform any one or more of the methodologies discussed herein.

FIG. 9 is a block diagram of machine in the example form of a computer system 900 within which instructions 924 can be executed for causing the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions 924 to perform any one or more of the methodologies discussed herein.

The example computer system 900 includes a processor 902 (e.g., a CPU, a graphics processing unit (GPU), or both), a main memory 904 and a static memory 906, which communicate with each other via a bus 908. The computer system 900 can further include a video display 910 (e.g., a liquid crystal display (LCD) or a cathode ray tube (CRT)). The computer system 900 also includes an alphanumeric input device 912 (e.g., a keyboard or a touch-sensitive display screen), a cursor control device 914 (e.g., a mouse), a storage unit 916, a signal generation device 918 (e.g., a speaker), and a network interface device 920.

Machine-Readable Medium

The storage unit 916 includes a machine-readable medium 922 on which is stored one or more sets of instructions 924 (e.g., software) embodying or utilized by any one or more of the methodologies or functions described herein. The instructions 924 can also reside, completely or at least partially, within the main memory 904 and/or within the processor 902 during execution thereof by the computer system 900, the main memory 904 and the processor 902 also constituting machine-readable media 922.

While the machine-readable medium 922 is shown in an example embodiment to be a single medium, the term "machine-readable medium" can include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory including, by way of example, semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 can further be transmitted or received over a communications network 926 using a transmission medium. The instructions 924 can be transmitted using the network interface device 920 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method executable by one or more hardware processors, the computer-implemented method comprising:

receiving information to be stored in a record, the information comprising at least two pieces of data of at least two different data types, at least one of the data types being of a variable length;

creating, by the one or more hardware processors, a data structure, the data structure comprising a first portion indicating an size for each offset field in a table of offsets, a second portion comprising an offset pointing to a third portion of the data structure, the third portion of the data structure containing the table of offsets, each offset field in the table of offsets pointing to a different one of the at least two pieces of data and having the size indicated in the first portion, the at least two pieces of data stored in a fourth portion of the data structure;

creating, by the one or more hardware processors, a schema for the data structure, the schema storing metadata for the at least two pieces of data; and storing the data structure and the schema in a database.

2. The computer-implemented method of claim 1, wherein the information is a forward index containing a mapping between word and/or terms and their appearances in one or more documents.

3. The computer-implemented method of claim 2, wherein the one or more documents are member profiles in a social network, and the at least two pieces of data are different fields of a member profile.

4. The computer-implemented method of claim 3, further comprising:

receiving a search query;

parsing the search query to discover a field in the data structure to search in response to the search query;

accessing the schema to retrieve metadata about the field to search, the metadata including an indication of how many pieces of data precede the field to search in the data structure;

traversing one or more instances of the data structure by, for each instance of the data structure, identifying the offset in the second portion of the data structure and using the offset to locate the third portion of the data structure, then identifying an offset in the table of offsets in the third portion of the data structure that corresponds to the field to search based on the retrieved metadata, then locating a piece of data stored in the fourth portion of the data structure corresponding to the identified offset in the table of offsets, and then reading the piece of data; and forming a response to the search query based on the read piece of data for each of the one or more instances of the data structure.

5. The computer-implemented method of claim 1, wherein the data structure is a variable-size array and each offset identifies a different byte in the variable-size array.

6. The computer-implemented method of claim 1, wherein each offset is a number identifying a location in the data structure.

7. The computer-implemented method of claim 1, wherein the size is one more than a total number of pieces of data stored in the data structure.

8. A computer-implemented method executable by one or more hardware processors, the computer-implemented method comprising:

receiving a search query;

parsing, using the one or more hardware processors, the search query to discover a field in a data structure to search in response to the search query;

accessing, using the one or more hardware processors, a schema to retrieve metadata about the field to search, the metadata including an indication of how many pieces of data precede the field to search in the data structure;

traversing, using the one or more hardware processors, one or more instances of the data structure by, for each instance of the data structure, identifying an offset in a second portion of the data structure and using the offset to locate a third portion of the data structure, then identifying an offset in a table of offsets in the third portion of the data structure that corresponds to the field to search based on the retrieved metadata, then locating a piece of data stored in a fourth portion of the data structure corresponding to the identified offset in the table of offsets, and then reading the piece of data; and forming a response to the search query based on the read piece of data for each of the one or more instances of the data structure.

9. The computer-implemented method of claim 8, wherein each of piece of data in the fourth portion of the data structure is a portion of a forward index containing a mapping between a word and/or terms and their appearances in one or more documents.

10. The computer-implemented method of claim 9, wherein the one or more documents are member profiles in a social network, and the pieces of data are different fields of a member profile.

11. The computer-implemented method of claim 8, wherein the data structure is a variable-size array and each offset identifies a different byte in the variable-size array.

12. The computer-implemented method of claim 8, wherein each offset is a number identifying a location in the data structure.

13. The computer-implemented method of claim 8, wherein a size of the data structure is one more than a total number of pieces of data stored in the data structure.

14. A non-transitory machine-readable storage medium having instruction data to cause a machine to perform the following operations:

receiving information to be stored in a record, the information comprising at least two pieces of data of at least two different data types, at least one of the data types being of a variable length;

creating, by the one or more hardware processors, a data structure, the data structure comprising a first portion indicating an size for each offset field in a table of offsets, a second portion comprising an offset pointing to a third portion of the data structure, the third portion of the data structure containing the table of offsets, each offset field in the table of offsets pointing to a different one of the at least two pieces of data and having the size indicated in the first portion, the at least two pieces of data stored in a fourth portion of the data structure;

creating, by the one or more hardware processors, a schema for the data structure, the schema storing metadata for the at least two pieces of data; and storing the data structure and the schema in a database.

15. The non-transitory machine-readable storage medium of claim 14, wherein the information is a forward index containing a mapping between a word and/or terms and their appearances in one or more documents.

16. The non-transitory machine-readable storage medium of claim 15, wherein the one or more documents are member profiles in a social network, and the at least two pieces of data are different fields of a member profile.

17. The non-transitory machine-readable storage medium of claim 16, wherein the operations further comprise:

receiving a search query;

parsing the search query to discover a field in the data structure to search in response to the search query;

accessing the schema to retrieve metadata about the field to search, the metadata including an indication of how many pieces of data precede the field to search in the data structure;

traversing one or more instances of the data structure by, for each instance of the data structure, identifying the offset in the second portion of the data structure and using the offset to locate the third portion of the data structure, then identifying an offset in the table of offsets in the third portion of the data structure that corresponds to the field to search based on the retrieved metadata, then locating a piece of data stored in the fourth portion of the data structure corresponding to the identified offset in the table of offsets, and then reading the piece of data; and forming a response to the search query based on the read piece of data for each of the one or more instances of the data structure.

18. The non-transitory machine-readable storage medium of claim 14, wherein the data structure is a variable-size array and each offset identifies a different byte in the variable-size array.

19. The non-transitory machine-readable storage medium of claim 14, wherein each offset is a number identifying a location in the data structure.

20. The non-transitory machine-readable storage medium of claim 14, wherein the size is one more than a total number of pieces of data stored in the data structure.

* * * * *